(12) United States Patent
Fujimoto et al.

(10) Patent No.: US 6,620,887 B2
(45) Date of Patent: Sep. 16, 2003

(54) CROSSLINKED FINE PARTICLES AND CURABLE RESIN COMPOSITION

(75) Inventors: Juichi Fujimoto, Nagoya (JP); Seiji Nushi, Nagoya (JP); Hiroshi Fukushima, Nagoya (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 0 days.

(21) Appl. No.: 09/887,433

(22) Filed: Jun. 25, 2001

(65) Prior Publication Data

US 2003/0054170 A1 Mar. 20, 2003

(51) Int. Cl.[7] ................. C08F 222/10; C08L 33/06; C08J 3/24; C09D 4/02; C09D 5/00
(52) U.S. Cl. ................. 525/193; 522/116; 522/120; 522/123; 427/214; 428/403; 428/407
(58) Field of Search ................. 525/193; 522/120, 522/123, 116; 264/4.7; 427/214; 428/402.22, 402.24, 403, 407

(56) References Cited

U.S. PATENT DOCUMENTS 6,206,550 B1 * 3/2001 Fukushima et al. ......... 362/335

FOREIGN PATENT DOCUMENTS

| JP | 61-4861 | | 2/1986 |
|---|---|---|---|
| JP | 3-212460 | | 9/1991 |
| JP | 3-252460 | | 11/1991 |
| JP | 4-202213 | | 7/1992 |
| JP | 5-202163 | | 8/1993 |
| JP | 6-25210 | | 4/1994 |
| JP | 7-228644 | | 8/1995 |
| JP | 2703125 | | 10/1997 |
| JP | 2979229 | | 9/1999 |
| JP | 2000-178398 | * | 6/2000 |

* cited by examiner

Primary Examiner—Nathan M. Nutter
(74) Attorney, Agent, or Firm—Oblon, Spivak, McClelland, Maier & Neustadt, P.C.

(57) ABSTRACT

Crosslinked fine particles having a Tg of 100° C. or higher and an amount of remaining double bonds of 0.01 mmol/g or more, which are obtainable by polymerizing a compound ($a_1$) having one or two radical-polymerizable ethylenic unsaturated groups in the molecule and a compound ($a_2$) having three or more (meth)acryloyl groups in the molecule.

16 Claims, No Drawings

CROSSLINKED FINE PARTICLES AND CURABLE RESIN COMPOSITION

BACKGROUND OF THE INVENTION (1) Field of the Invention

The present invention relates to a resin composition useful as a radiation curable resin composition, a thermosetting resin composition, and to a resin composition that has a low viscosity, a low shrink property and a rapid-curability, unlike a conventional curable resin composition.

(2) Description of the Related Art

Radical-polymerization type radiation curable resin compositions are utilized in the field of surface fabrication because they are rapidly curable at low temperatures, and the cured coating films have excellent scuff and chemical resistance. However, the radiation curable resin compositions, usually tend to have high viscosities at room temperature. Therefore, it is necessary to reduce the viscosities in order to facilitate their application.

The use of organic solvents or diluent monomers having low viscosities are necessary for viscosity reduction of the curable resin compositions. As a result, environmental concerns such as increased volatile organic compound (VOC) contents, skin irritation caused by the diluent monomers, along with the decreased curing rates of the resin compositions are observed.

In general, radiation curable resin compositions shrink remarkably in volume upon curing, therefore, a method comprising the addition of a high-molecular weight oligomer or polymer is adopted to reduce the percentage of shrinkage. However, when this method is adopted, the viscosity of the resin is increased; the coating properties are deteriorated; and further the coating curability is deteriorated by the decrease in resin concentration at the reaction site.

In the field of film coating materials, for example, radiation curable resin compositions draw attention. For instance, JP-A-3-252460 discloses a composition for coating material which comprises an ethylenic unsaturated compound having a molecular weight of 500 or less, a styrene-based polymer having a softening point of 70° C. or higher, and a photopolymerization initiator which has excellent adhesive properties to various substrates, high gloss, blocking resistance, scratch resistance, water resistance, etc.

However, since the aforesaid composition contains a styrene-based polymer having no photo-reactivity, its viscosity becomes so high that the coatability is poor depending on the amount of the styrene-based polymer added. Moreover, since a large amount of the photopolymerization initiator must be incorporated into the composition in order to attain a high productivity, a large amount of the photopolymerization initiator remains in the cured coating film, resulting in a film product having the unpleasant odor of the photopolymerization initiator. Thus, a product having satisfactory overall performance characteristics could not be obtained.

In the field of coating materials for wood coatings, rapid-curing radiation curable compositions have come to be extensively used which entail a low energy cost and are good in productivity. Of these radiation curable compositions, those that contain an unsaturated polyester resin, inter alia, have been extensively used because they give a cured coating film that is excellent in finished appearance involving gloss and feeling of fleshiness, and they are inexpensive.

However, in the case of coating films having such a composition, the surface curing speed is lower than the in-depth curing speed, resulting in insufficient productivity of the applied and cured product. Moreover, since the internal strain of the cured coating film is increased by the cure shrinkage of one or more monomers and oligomers contained in the composition, the composition has the disadvantage in that the cured coating film tends to be cracked by repeated heating and cooling.

To overcome these problems, JP-A-4-202213 discloses a composition using a maleic acid-based unsaturated polyester containing a specific glycol component, and JP-A-5-202163 discloses a composition using an epoxy acrylate, a specific acryl polyol component and an isocyanate compound.

The composition disclosed in JP-A-4-202213 requires the use of styrene monomer as a diluent to improve the coating efficiency. The use of styrene monomer deteriorates the surface curability, however, and the work environment is harmed by odor from the volatilization of the styrene monomer. The composition disclosed in JP-A-5-202163 also fails to improve the work environment because it has a high viscosity and hence requires the use of a diluent, such as an organic solvent, to improve the coating work efficiency required for practical use.

In recent years, printing inks that can be cured by active energy rays such as electron rays, ultraviolet rays, visible rays, etc. have been increasingly substituted for common oil inks, because of their many advantages, such as faster printing and delivery, hygienic properties, etc. These printing inks comprise a composition containing a radical-polymerizable monomer, an oligomer and a coloring agent such as a pigment. As specific examples of the printing inks, the composition systems which also use in combination a diallyl phthalate-based polymer disclosed in, for example, JP-B-61-4861 and JP-A-3-212460 have been extensively used from the viewpoint of printability, curability, mar resistance, etc. These composition systems, however, involve the following problems. Since the diallyl phthalate-based polymer has no photo-reactivity, a photopolymerization initiator should be used in said composition systems in a larger amount than in composition systems composed of a radical-polymerizable monomer and an oligomer in order to attain a practical curing rate. In addition, when a large amount of the aforesaid diallyl phthalate-based polymer is added to control the polymerization shrinkage and improving the adhesive properties to a substrate, the viscosity is extremely increased, so that the printability, leveling properties, appearance and the like are deteriorated.

When the composition system disclosed is used as colored printing ink, its curing rate tends to decrease compared to an uncolored composition because of the remarkable light absorption by a dye or pigment for the coloring. Therefore, a larger amount of a photopolymerization initiator is necessary in order to attain a practical curing rate.

Moreover, when the amount of the photo-polymerization initiator is increased in order to improve the curability, the surface curability is improved, but the in-depth curability was not sufficient owing to remarkable light absorption in the surface layer, with the result that that the adhesive properties of the resulting coating film to a substrate are deteriorated.

Thus, it has been difficult to obtain all three conflicting characteristics, i.e., low viscosity, low shrink properties and rapid curability in a solvent-free radiation curable resin composition in all applications of the resin composition. To solve this problem, a method of foaming the resin composition during curing in order to prevent cure shrinkage, and a method of adding solid fine particles as disclosed in JP-A-7-228644, etc. have been proposed. These methods, however, have the disadvantage in that when the obtained resin composition is used as a coating material, the resulting cured coating film has an unsatisfactory appearance.

The reactive microgels disclosed in Japanese Patent No. 2703125 and JP-B-6-25210 are crosslinked fine particles with a small particle size and reactivity and, hence, do not undesirably influence the coating appearance, so they might be capable of solving the above problems. However, although these microgels are suitable for use inca resist composition for lithographic plates, they cannot achieve the low viscosity intended according to the present invention, for the following reason. The crosslinking density of particles of the microgel is so low that a solvent-free coating material cannot be obtained by mixing fine particles of the microgel with another radical-polymerizable monomer because the fine particles are swelled by the radical polymerizable monomer during mixing. The low viscosity was not obtained with these microgels.

Thus, conventional radiation curable resins cannot have all three characteristics: low viscosity, low shrink properties and rapid curability. Also during the production of a heat-cured coating film or a heat-cured molded article, there was a problem with achieving both a low viscosity and low shrink properties.

SUMMARY OF THE INVENTION

An object of the present invention is to provide a resin composition having all of the above-mentioned various properties at the same time and a crosslinked-fine-particle dispersion type curable resin composition using the aforesaid resin composition, by dispersing specific crosslinked fine particles in a radiation curable resin or a thermosetting resin composition.

The present inventors have found that all the three characteristics, low viscosity, low shrink properties and rapid curability can be obtained at the same time by dispersing crosslinked fine particles (A) obtained by polymerizing a compound ($a_1$) having one or two radical-polymerizable ethylenic unsaturated groups in the molecule and a compound ($a_2$) having three or more (meth)acryloyl groups in the molecule, in a compound (B) having at least one (meth)acryloyl group in the molecule.

That is, the present invention is a curable resin composition substantially free of water and solvents which is characterized by comprising crosslinked fine particles (A) with an average primary-particle diameter in a range of 10 to 1,000 nm obtained by polymerizing a compound ($a_1$) having one or two radical-polymerizable ethylenic unsaturated groups in the molecule and a compound ($a_2$) having three or more (meth)acryloyl groups in the molecule, and a compound (B) having at least one (meth)acryloyl group in the molecule.

The use of the crosslinked fine particles of the present invention enabled the same extent of shrinkage reduction with less viscosity increase compared to cases in which a conventional polymer or oligomer was incorporated. Moreover, the curing rate can be overwhelmingly increased. Therefore, unlike conventional radiation curable resin compositions, a curable resin composition can be obtained which satisfies all three characteristics, i.e., low viscosity, low shrinkage properties and rapid curability. Accordingly, the crosslinked fine particles are useful in various fields such as casting resins, coating materials, adhesives, inks, stereo lithography, photoresists, etc.

PREFERRED EMBODIMENT OF THE INVENTION

The components of the resin composition and crosslinked-fine-particle dispersion type resin composition of the present invention are explained below in detail.

In the present specification, the term "(meth)acrylic acid" means "acrylic acid and/or methacrylic acid", and the term "(meth)acryloyl group" means "acryloyl group and/or methacryloyl group".

The crosslinked fine particles (A) which constitute the present invention are fine particles obtained by polymerizing a compound ($a_1$) having one or two radical-polymerizable ethylenic unsaturated groups in the molecule and a compound ($a_2$) having three or more (meth)acryloyl groups in the molecule. In the present specification, the crosslinked fine particles (A) refer to dried particles which are free of water and organic solvents.

The structure of the crosslinked fine particles (A) used in the present invention is not particularly limited and may be any of a single-layer structure, core/shell structure, laminated structure, etc.

The crosslinked fine particles (A) used in the present invention have the following characteristics not attained before: they cause only a slight viscosity increase when added to a dispersion medium component (B), and they decrease the polymerization shrinkage of the resin composition.

The component ($a_1$) used for obtaining the crosslinked fine particles (A) is a compound ($a_1$) having one or two radical-polymerizable ethylenic unsaturated groups in the molecule, and may be properly chosen in view of the purpose of use, required properties, etc. of the resin composition of the present invention.

Specific examples of the component ($a_1$) include aromatic vinyl monomers such as styrene, α-methylstyrene, α-chlorostyrene, vinyltoluene, divinylbenzene, etc.; vinyl ester monomers such as vinyl acetate, vinyl butyrate, N-vinylformamide, N-vinylacetamide, N-vinyl-2-pyrrolidone, N-vinylcaprolactam, divinyl adipate, etc.; vinyl ethers such as ethyl vinyl ether, phenyl vinyl ether, etc.; acrylamides such as acrylamide, N-methylolacrylamide, N-methoxymethyl acrylamide, N-butoxymethyl acrylamide, N-t-butyl acrylamide, acryloylmorpholine, methylenebisacrylamide, etc.; (meth)acrylic acid; and (meth)acrylic acid esters such as methyl (meth)acrylate, ethyl (meth)acrylate, propyl (meth)acrylate, n-butyl (meth)acrylate, i-butyl (meth)acrylate, t-butyl (meth)acrylate, hexyl (meth)acrylate, 2-ethylhexyl (meth)acrylate, lauryl (meth)acrylate, stearyl (meth)acrylate, tetrahydrofurfuryl (meth)acrylate, 2-hydroxyethyl (meth)acrylate, 2-hydroxypropyl (meth)acrylate, 4-hydroxybutyl (meth) acrylate, glycidyl (meth)acrylate, dimethylaminomethyl (meth)acrylate, diethylaminomethyl (meth)acrylate, benzyl (meth)acrylate, cyclohexyl (meth)acrylate, phenoxyethyl (meth)acrylate, tricyclodecane (meth)acrylate, allyl (meth) acrylate, 2-ethoxyethyl (meth)acrylate, isobornyl (meth) acrylate, phenyl (meth)acrylate, ethylene glycol di(meth) acrylate, polyethylene grycol di(meth)acrylate, 1,3-butylene glycol di(meth)acrylate, 1,4-butanediol di(meth)acrylate, 1,6-hexanediol di(meth)acrylate, neopentyl glycol di(meth) acrylate, neopentyl glycol hydroxypivalate di(meth)acrylic acid ester, polypropylene grycol di(meth)acrylate, bisphenol A polyoxyethylene di(meth)acrylate, hydrogenated bisphenol A polyoxyethylene di(meth)acrylate, hydrogenated bisphenol A di(meth)acrylate, cyclohexanedimethanol di(meth)acrylate, cyclohexanediol di(meth)acrylate, tricyclodecanedimethanol di(meth)acrylate, polytetramethylene glycol di(meth)acrylate, etc. Among these, preferred are (meth)acrylic acid, methyl (meth)acrylate, ethyl (meth) acrylate, propyl (meth)acrylate, n-butyl (meth)acrylate, i-butyl (meth)acrylate, t-butyl (meth)acrylate, ethylene glycol di(meth)acrylate, 1,3-butylene glycol di(meth)acrylate, 1,4-butanediol di(meth)acrylate, 1,6-hexanediol di(meth) acrylate, neopentyl glycol di(meth)acrylate, etc.

The above-exemplified compounds may be used either singly or in combination.

Next, the component ($a_2$) used for obtaining the crosslinked fine particles (A) is a compound having three or more (meth)acryloyl groups in the molecule. This compound ($a_2$) having three or more (meth)acryloyl groups has a high reactivity and an excellent crosslinking effect and hence is a crosslinking agent component necessary for crosslinking the above-mentioned component ($a_1$) at a high density. Furthermore, synthesizing the crosslinked fine particles using the crosslinking agent ($a_2$) with three or more (meth)acryloyl groups enables a large number of radical-polymerizable ethylenic unsaturated groups derived from the crosslinking agent remaining on the surfaces and/or in the interior of the crosslinked fine particles.

In the present invention, when only a compound having two (meth)acryloyl groups is used as a crosslinking agent in place of the component ($a_2$), crosslinked fine particles having a low crosslinking density tend to be obtained. Therefore, when these fine particles are dispersed in the compound (B) having at least one (meth)acryloyl group in the molecule, the component (B) infiltrates into the fine particles, so that the viscosity of the resulting resin composition tends to be extremely increased. In this case, the number of radical-polymerizable ethylenic unsaturated groups remaining in the crosslinked fine particles tend to be very small, so that it tends to be impossible to increase the curing rate of the curable composition that contains the crosslinked fine particles.

Specific examples of the component ($a_2$) include (meth) acrylic acid esters such as trimethylolpropane tri(meth) acrylic acid ester, ethoxylated trimethylolpropane tri(meth) acrylic acid ester, propoxylated trimethylolpropane tri(meth) acrylic acid ester, glycerol tri(meth)acrylic acid ester, ethoxylated glycerol tri(meth)acrylic acid ester, tris (acryloxyethyl) isocyanurate, ditrimethylolpropane tetra (meth)acrylic acid ester, pentaerythritol tri(meth)acrylic acid ester, pentaerythritol tetra(meth)acrylic acid ester, dipentaerythritol penta(meth)acrylic acid ester, dipentaerythritol hexa(meth)acrylic acid ester, etc.; urethane poly(meth) acrylates obtained by adding a (meth)acrylate having a hydroxyl group (e.g. 2-hydroxyethyl (meth)acrylate, 2-hydroxypropyl (meth)acrylate, 4-hydroxybutyl (meth) acrylate and a caprolactone adduct thereof) to a trimer or higher-order oligomer of a diisocyanate compound (e.g. hexamethylene diisocyanate, isophorone diisocyanate, tolylene diisocyanate, xylylene diisocyanate, diphenylmethane diIsocyanate and hydrogenated diphenylmethane diisocyanate); and epoxy poly(meth)acrylates obtained by adding (meth)acrylic acid to a polyepoxy compound having three or more epoxy groups in the molecule, such as a trifunctional or higher-order polyfunctional phenolic novolak type epoxy resin, a trifunctional or higher-order polyfunctional cresol novolak type epoxy resin, pentaerythritol polyglycidyl ether, trimethylolpropane triglycidyl ether, triglycidyltris(2-hydroxyethyl) isocyanurate or the like. Among these compounds, when trimethylolpropane tri (meth)acrylic acid ester, ditrimethylolpropane tetra(meth) acrylic acid ester, pentaerythritol tri(meth)acrylic acid ester, pentaerythritol tetra(meth)acrylic acid ester, dipentaerythritol penta(meth)acrylic acid ester, dipentaerythritol hexa (meth)acrylic acid ester or the like are used, double bonds derived from the compound ($a_2$) tend to be well left on polymerizing the compounds ($a_1$) and ($a_2$), which is desirable.

The above-exemplified compounds may be used either singly or in combination.

In the present invention, the proportions of the compounds constituting the crosslinked fine particles (A), i.e., the compound ($a_1$) having one or two radical-polymerizable ethylenic unsaturated groups in the molecule and the compound ($a_2$) having three or more (meth)acryloyl groups in the molecule are not particularly limited. The proportion of the component ($a_1$) ranges preferably from 55 to 95 wt %, more preferably, 65 to 95 wt %, in the total proportion (100 wt %) of the component ($a_1$) and the component ($a_2$). The proportion of the component ($a_2$) ranges preferably from 5 to 45 wt %, more preferably, 5 to 35 wt %.

When the proportion of the component ($a_2$) relative to the component ($a_1$) is less than 5 wt %, the crosslinking density of the crosslinked fine particles becomes low. Therefore, when the resulting fine particles are dispersed in the radical-polymerizable unsaturated compound (B), the component (B) infiltrates into the fine particles, so that the viscosity of the resulting resin composition tends to be extremely increased. When the proportion of the component ($a_2$) relative to the component ($a_1$) is more than 45 wt %, gelation tends to take place during the polymerization.

In the present invention, the crosslinked fine particles, component (A), can be obtained by polymerization by a well-known polymerization method. An emulsion polymerization method is especially preferable.

The emulsion polymerization method is not particularly limited. Examples of emulsion polymerization methods include mixing-in-one-lot polymerization method, monomer dropping method, pre-emulsion method, seed polymerization method, multi-stage (core/shell) polymerization method, etc.

When the above-exemplified emulsion polymerization method is adopted, the polymerization is preferably carried out with the use of an emulsifying agent in order to produce the crosslinked fine particles industrially.

Specific examples of emulsifying agent suitable for obtaining the crosslinked fine particles used in the present invention include nonionic surfactants such as polyethylene glycol nonylphenyl ether, polyethylene glycol dodecylphenyl ether, etc.; anionic surfactants such as sodium lauryl sulfate, sodium laurylbenzenesulfonate, sodium dodecylbenzenesulfonate, sodium dialkylsulfosuccinates, etc,; and reactive surfactants such as polyoxyethylene alkylphenyl ether acrylic acid esters, polyoxyethylene alkylpropenylphenyl ethers, polyoxyethylene alkylpropenylphenyl ether sulfuric acid ester ammonium salts, ammonium salt of α-sulfo-ω-(1-((nonylphenoxy)methyl)-2-(2-propenyloxy) ethoxy)-poly(oxy-1,2-ethanediyl), etc.

Among the above-exemplified emulsifying agents, the anionic surfactants superior in emulsifying capability are preferable. Radical-reactive anionic surfactants that can be incorporated into the fine particles are more preferable for improving the durability of a coating film.

The proportion of the emulsifying agent used is preferably 0.1 to 8 wt % based on the total weight of the component ($a_1$), the component ($a_2$) and pure water at the time of emulsion polymerization. Specifically, the following proportions are preferable: pure water 100 to 300 parts by weight, the total amount of the component ($a_1$), and the component ($a_2$) (=polymerizable monomers) 50 to 150 parts by weight, and the emulsifying agent 0.45 to 13 parts by weight.

The crosslinked fine particles (A) thus obtained are blended with the compound (B) after being dried by water removal.

The component (A) used in the present invention refers to one which is in a dried and pulverized state. The drying method is not particularly limited and includes a method comprising coagulation, washing, drying and then pulverization, a spray drying method, etc.

For example, when the curable resin composition of the present invention is utilized as an radiation curable resin composition, the spray drying method is preferred because it gives fine particles (A) having a small average particle diameter of aggregated particles, which tend to be easily dispersed when mixed with a resin composition.

The average primary-particle diameter of the cross-linked fine particles (A) used in the present invention ranges from 10 to 1,000 nm. The reason is as follows. When the average primary-particle diameter of the component (A) is less than 10 nm, the viscosity of the resulting resin composition tends to be greatly increased. When the average primary-particle diameter of the component (A) is more than 1,000 nm, the appearance of a cured coating film of the resulting resin composition tends to be unsatisfactory.

The especially preferable range of the average primary-particle diameter is 50 to 800 nm. The average primary-particle diameter ranges more preferably from 50 to 250 nm from the viewpoint of the transparency of a coating film.

In the present invention, the percentage of cubical expansion of the crosslinked fine particles (A) in methyl ethyl ketone at 25° C. is not particularly limited. The percentage of cubical expansion is preferably 300% or less because when such fine particles are dispersed in the radical-polymerizable unsaturated compound (B), the viscosity of the resulting resin composition tends to be not extremely increased when the component (B) infiltrates into the fine particles. The percentage of cubical expansion is preferably, in particular, 250% or less.

In order to obtain the crosslinked fine particles (A) having a percentage of cubical expansion in methyl ethyl ketone at 25° C. of 300% or less, the proportions of the compounds constituting the crosslinked fine particles (A), i.e., the ethylenic unsaturated compound ($a_1$) and the compound ($a_2$) having three or more (meth)acryloyl groups in the molecule are as follows: in the total proportion (100 wt %) of the component ($a_1$) and the component ($a_2$), the proportion of the component ($a_1$) ranges preferably from 95 to 65 wt %, and the proportion of the component ($a_2$) ranges from 5 to 35 wt %.

In the present invention, the percentage of cubical expansion (%) in methyl ethyl ketone of the crosslinked fine particles (A) is calculated by the following method.

The primary-particle diameter of crosslinked fine particles obtained by the above-mentioned emulsion polymerization method is measured at 25° C. by a dynamic light scattering method, and the average particle diameter of the crosslinked fine particles is taken as $R_1$. The dried and pulverized crosslinked fine particles (A) are re-dispersed in methyl ethyl ketone at 25° C. and their average-particle diameter is measured by using the same system as above. This average particle diameter is taken as $R_2$.

The method for dispersing the crosslinked fine particles (A) in methyl ethyl ketone is not particularly limited. The crosslinked fine particles (A) can be dispersed by the use of any dispersing machine such as a homodisperser, dissolver, three roll mill, ball mill or the like after being mixed with methyl ethyl ketone. The percentage of cubical expansion (%) in an organic solvent of the crosslinked fine particles is represented by V (%) in the following equation:

$$V=(R_2)^3/(R_1)^3 \times 100$$

The amount of double bonds remaining in the dried and pulverized crosslinked-fine-particles (A) used in the present invention is preferably 0.01 mmol/g or more. When the amount of the remaining double bonds is less than 0.01 mmol/g, the curability of the resulting curable composition containing the crosslinked fine particles (A) dispersed therein tends to be not improved, which is not desirable. Although the method for determining the amount of the remaining double bonds is not particularly limited, a value determined by the following determination method is defined as the amount of the remaining double bonds in the present invention.

One gram of the crosslinked fine particles (A) obtained are accurately measured (the accurately measured amount is taken as x g), and then the crosslinked fine particles accurately measured, 20 g of water and 4 g of tetrahydrofuran (THF) are placed in a 200-ml flask and stirred for 30 minutes. To the resulting mixture are added 10 ml of a 0.1N $KBrO_3$ aqueous solution and 5 ml of 6N HCl, immediately after which the flask was closed with a plug, followed by stirring in the dark for 5 minutes. Bromine is thus produced and added to double bonds remaining in the crosslinked fine particles. After the flask was allowed to stand in a dark room for 30 minutes, 5 ml of a 15 wt % KI aqueous solution is added into the flask while cooling the flask with ice water, and the resulting mixture is stirred for 5 minutes. By this stirring, non-added bromine is replaced with iodine. The iodine produced is titrated with a 0.1N $Na_2S_2O_3$ aqueous solution. The titration end point is a point at which the color of the dark-brown liquid changes to colorless or yellow. The amount of the remaining double bonds is determined from the titer according to the following equation:

$$\text{Amount of remaining double bonds (mmol/g)} = \frac{1}{2} \times [(\text{titer for blank}) - (\text{titer for sample})] \times 0.1 \times f \times (1/x)$$

wherein the titer for blank is the titer (ml) of the 0.1N $Na_2S_2O_3$ aqueous solution measured in the case of not using the sample (the fine particles) in the above determination method; the titer for sample is the titer (ml) of the 0.1N $Na_2S_2O_3$ aqueous solution measured in the case of using the sample (the fine particles) in the above determination method; f is a factor for 0.1N $Na_2S_2O_3$; and x is the amount (g) of the sample (the fine particles) accurately measured.

The glass transition temperature (Tg) of the dried and pulverized crosslinked-fine-particles (A) used in the present invention is preferably 100° C. or higher. When the glass transition temperature (Tg) is lower than 100° C., the curability of the resulting curable composition containing the crosslinked fine particles (A) dispersed therein tends to be not improved, which is not desirable. A method for measuring the Tg is not particularly limited. In the present invention, the dried and pulverized crosslinked-fine-particles (A) are placed directly on a glass stage, and the Tg is defined as a thermal and mechanical value determined from a change of the thermal expansion coefficient by using the TMA method.

The resin composition of the present invention is obtained by blending by dispersion the crosslinked fine particles (A) with the component (B). A method for dispersing the component (A) in the component (B) to blend them is not particularly limited. The component (A) can be dispersed in component (B) by the use of any dispersing machine such as a homodisper, dissolver, triple-roll mill, ball mill or the like after being mixed with the component (B).

In the present invention, the compound (B) having at least one (meth)acryloyl group in the molecule is used as a dispersion medium for the component (A).

As specific examples of the component (B), the (meth)acrylic acid esters mentioned above as specific examples of the component ($a_1$), and the component ($a_2$) can be used. In addition to these, there can be mentioned, for example, polyester poly(meth)acrylates obtained by the reaction of a polybasic acid (e.g. phthalic acid and adipic acid), a polyhydric alcohol (e.g. ethylene glycol, hexanediol, poly (ethylene glycol)s, poly(tetramethylene glycol)s) and (meth) acrylic acid or its derivative; epoxy poly(meth)acrylates obtained by reacting a glycidyl ether compound (e.g. bisphenol A diglycidyl ether and ethylene glycol diglycidyl ether) with a (meth)acrylic acid or its derivative; and urethane poly(meth)acrylates obtained by reacting an isocyanate compound (e.g. hexamethylene diisocyanate, isophorone diisocyanate, tolylene diisocyanate, xylylene diisocyanate, diphenylmethane diisocyanate, and hydrogenated diphenylmethane diisocyanate) with a (meth)acrylate having a hydroxyl group (e.g. 2-hydroxyethyl (meth)acrylate, 2-hydroxypropyl (meth)acrylate and 4-hydroxybutyl (meth)acrylate).

These may be used either singly or in combination.

The proportions of the crosslinked fine particles (A) and the compound (B) are as follows: in the total proportion (100 wt %) of the component (A) and the component (B), the proportion of the component (A) ranges from 5 to 50 wt %, and the proportion of the component (B) ranges from 50 to 95 wt %.

When the proportion of the component (A) is more than 50 wt %, the resulting resin composition has a high viscosity, so that its coatability tends to be poor. When the proportion of the component (A) is less than 5 wt %, the curability and low shrink properties intended according to the present invention tend to be insufficient.

It is preferable to incorporate radical polymerization initiators (C) such as photopolymerization initiators ($c_1$), thermal polymerization initiators ($c_2$) and the like into the curable resin composition of the present invention.

Specific examples of the photopolymerization initiators ($c_1$) include benzophenone, 4,4-bis(diethylamino)benzophenone, t-butylanthraquinone, 2-ethylanthraquinone, and thioxanthones (e.g. 2,4-diethylthioxanthone, isopropylthioxanthone and 2,4-dichlorothioxanthone); acetophenones such as diethoxyacetophenone, 2-hydroxy-2-methyl-1-phenylpropan-1-one, benzyl dimethyl ketal, 1-hydroxycyclohexyl phenyl ketone, 2-methyl-2-morpholino(4-thiomethylphenyl)propan-1-one, 2-benzyl-2-dimethylamino-1-(4-morpholinophenyl)-butanone, etc.; benzoin ethers such as benzoin methyl ether, benzoin ethyl ether, benzoin isopropyl ether, benzoin isobutyl ether, etc.; acylphosphine oxides such as 2,4,6-trimethylbenzoyl-diphenylphosphine oxide, bis(2,6-dimethoxybenzoyl)-2,4,4-trimethylpentylphosphine oxide, bis(2,4,6-trimethylbenzoyl)-phenylphosphine oxide, etc.; methylbenzoyl formate; 1,7-bisacrydinylheptane; 9-phenylacridine; etc.

These photopolymerization initiators ($c_1$) may be used singly or in combination and are incorporated into the present resin composition comprising the component (A) and the component (B), in a proportion of preferably 0.01 to 20 parts by weight, in particular, 0.1 to 10 parts by weight, per 100 parts by weight of the resin composition.

In addition, if necessary, well-known photosensitizers such as methyl 4-dimethylaminobenzoate, ethyl 4-dimethylaminobenzoate, amyl 4-dimethylaminobenzoate, 4-dimethylaminoacetophenone, etc. may be incorporated into the curable resin composition of the present invention.

Specific examples of the thermal polymerization initiators ($c_2$) include organic peroxides such as methyl ethyl ketone peroxide, benzoyl peroxide, dicumyl peroxide, t-butyl hydroperoxide, cumene hydroperoxide, t-butyl peroxyoctoate, t-butyl peroxybenzoate, lauroyl peroxide, etc.; azo compounds such as azobisisobutyronitrile, etc.; and redox polymerization initiators obtained by combining amines (e.g. N,N-dimethylaniline and N,N-dimethyl-p-toluidine) with any of the above-mentioned peroxides. The 10-hours half-life temperature of these thermal polymerization initiators ($c_2$) is preferably 100° C. or lower. If a thermal polymerization initiator having a 10-hours half-life temperature of higher than 100° C. is used, the curing rate tends not to be increased.

If necessary, metal soaps such as cobalt naphthenate, manganese naphthenate, nickel octylate, etc. may also be used.

These thermal polymerization initiators ($c_2$) may be used either singly or in combination and are incorporated into the resin composition comprising the component (A) and the component (B), in a proportion of preferably 0.001 to 10 parts by weight, in particular, 0.01 to 5 parts by weight, per 100 parts by weight of the resin composition.

In addition, well-known additives such as mold release agents, lubricants, plasticizers, antioxidants, ultraviolet absorbers, flame retardants, flame-retarding assistants, polymerization inhibitors, fillers, organic solvents usable in the present invention, pigments, dyes, silane coupling agents, etc. may be properly used depending on their purpose, in the resin composition and crosslinked-fine-particle dispersion type curable resin composition of the present invention.

The curable resin composition of the present invention is useful as a composition substantially free of water and solvents. The viscosity of said composition is preferably 10 Pa·s or less at 25° C., more preferably 5 Pa·s or less at 25° C., from the viewpoint of work-efficiency. A curable resin composition having a viscosity of more than 10 Pa·s at 25° C. requires heating in some cases at the time of coating or printing in order to reduce the viscosity and, thus, tends to result in the deterioration of the productivity. Moreover, even if the application or printing with such composition is possible the appearance of the resulting coating or print tends to be unsatisfactory, which is not desirable.

The curable resin composition of the present invention can be used in any of the fields of molded articles, adhesives, coating materials, inks, resins for stereo lithography, photoresists, etc. The method for curing said resin composition is not particularly limited, and the resin composition can be cured by various curing methods well known and conventionally used in the fields mentioned above.

In particular, the resin composition causes only a slight viscosity increase when added to a dispersion medium, it is excellent in curability and can have low shrink properties. Therefore, the resin composition can exhibit its performance characteristics to the utmost when used as a radiation curable resin which can be used, for example, for film coatings and wood coatings and in printing inks.

The present invention is concretely illustrated below with examples and comparative examples.

EXAMPLE 1

Preparation of a Starting Pre-emulsion

A pre-emulsion was obtained by mixing 55 parts by weight of methyl methacrylate, 30 parts by weight of n-butyl methacrylate, 15 parts by weight of PETA (a mixture consisting of 60% of pentaerythritol triacrylate and 40% of pentaerythritol tetraacrylate), 0.3 part by weight of a peroxide initiator (Perbutyl H, a trade name, mfd. by Nippon Oils and Fats Co., Ltd.), 3 parts by weight of sodium dodecylbenzene-sulfonate and 55 parts by weight of pure water, and stirring the resulting mixture continuously.

Preparation of Crosslinked Fine Particles

In a 2-liter four-necked flask were placed 145 parts by weight of pure water, 0.3 part by weight of Rongalite, 0.01 part by weight of ethylenediamine-N,N,N',N'-tetraacetic acid disodium salt and 0.0025 part by weight of ferrous sulfate heptahydrate, and they were stirred at 150 rpm with an anchor-shaped stirring rod.

After the air in the system was replaced with nitrogen gas introduced into the system, the temperature was begun to be raised. When the internal temperature reached 60° C., dropwise addition of the pre-emulsion was started and 40 parts by weight of the pre-emulsion was added dropwise in 30 minutes, followed by continuous stirring at an internal temperature of 60° C. for 30 minutes. Then, the whole of 120 parts by weight of the residual starting pre-emulsion was added dropwise in 2 hours. The resulting mixture was continuously stirred for 2 hours while maintaining the internal temperature at 60° C., and was then cooled to obtain a milk-white emulsion. A portion of the obtained emulsion was sampled and its average primary-particle diameter R, at 25° C. was measured with a dynamic light-scattering photometer DLS-600 manufactured by Otsuka Electronics Co., Ltd. The result obtained is shown in Table 1.

The obtained emulsion was subjected to spray drying with a spray dryer Model L-8 manufactured by Ohkawara Kakohki Co.,Ltd., to obtain crosslinked fine particles (P1).

The spray drying conditions were as follows: chamber inlet temperature of 120° C., chamber outlet temperature of 60° C., and the number of revolution of an atomizer of 25,000 rpm. The thus obtained powder contained no blocking substance and had a high fluidity.

Preparation of a Dispersion of the Fine Particles in Methyl Ethyl Ketone

A milk-white resin composition was obtained by mixing 20 parts by weight of the crosslinked fine particles (P1) obtained and 80 parts by weight of methyl ethyl ketone, and stirring the resulting mixture in a homodisper for 5 minutes at a number of revolution of 2,000 rpm. A portion of the obtained milk-white resin composition was sampled and its average primary-particle diameter $R_2$ at 25° C. was measured with a dynamic light-scattering photometer DLS-600 manufactured by Otsuka Electronics Co., Ltd. The result obtained is shown in Table 1.

Evaluation of the Percentage of Cubical Expansion of the Crosslinked Fine Particles in the Organic Solvent The percentage of cubical expansion of the crosslinked fine particles in the organic solvent was calculated from the average primary-particle diameter $R_1$ of the emulsion in water after the emulsion polymerization and the average primary-particle diameter $R_2$ of the fine particles in methyl ethyl ketone, and is shown in Table 1.

Evaluation of the Amount of Double Bonds Remaining in the Crosslinked Fine Particles One gram of the crosslinked fine particles (P1) obtained were accurately measured (the accurately measured amount is taken as x g), and then the crosslinked fine particles accurately measured, 20 g of water and 4 g of tetrahydrofuran (THF) were placed in a 200-ml flask and stirred for 30 minutes. To the resulting mixture were added 10 ml of a 0.1N $KBrO_3$ aqueous solution and 5 ml of 6N HCl, immediately after which the flask was closed with a plug, followed by stirring in the dark for 5 minutes (bromine is thus produced and added to double bonds remaining in the crosslinked fine particles). After the flask was allowed to stand in a dark room for 30 minutes, 5 ml of a 15 wt % KI aqueous solution was placed in the flask while cooling the flask with ice water, and the resulting mixture was stirred for 5 minutes (bromine not added to double bonds is replaced with iodine in this way). The iodine produced was titrated with a 0.1N $Na_2S_2O_3$ aqueous solution. The titration end point was a point at which the color of the dark-brown liquid had changed to colorless or yellow. Table 1 shows the result of determining the amount of the remaining double bonds from the titer according to the following equation:

Amount of remaining double bonds (mmol/g) =

$$\frac{1}{2} \times [(\text{titer for blank}) - (\text{titer for sample})] \times 0.1 \times f \times (1/x)$$

wherein the titer for blank is the titer (ml) of the 0.1N $Na_2S_2O_3$ aqueous solution measured in the case of not using the sample (the fine particles) in the above determination method; the titer for sample is the titer (ml) of the 0.1N $Na_2S_2O_3$ aqueous solution measured in the case of using the sample (the fine particles) in the above determination method; f is a factor for 0.1N $Na_2S_2O_3$; and x is the amount (g) of the sample (the fine particles) accurately measured.

Evaluation of the Glass Transition Temperature of the Crosslinked Fine Particles The crosslinked fine particles (P1) obtained were placed directly on a glass stage and subjected to TMA measurement in a temperature range of 20° C. to 250° C. at a heating rate of 10° C./min by using a quartz probe. A temperature at which the expansion coefficient had changed was determined from a thermal expansion curve measured by the TMA method and is shown as Tg in Table 1.

Preparation of an Radiation Curable Resin Composition

Thirty parts by weight of the crosslinked fine particles (P1) obtained, 20 parts by weight of dipentaerythritol hexaacrylate, 50 parts by weight of tripropylene glycol diacrylate and 5 parts by weight of 1-hydroxycyclohexyl phenyl ketone as a photopolymerization initiator were mixed and then stirred for 5 minutes in a homodisper at a number of revolution of 4,000 rpm to obtain a milk-white radiation curable resin composition. The evaluation results of film performance for the resin composition are described below.

Evaluation of the Radiation Curable Resin Composition

For the radiation curable resin composition obtained, the E-type viscosity at 25° C. and the polymerization shrinkage determined from the difference between the specific gravities of the liquid composition and a cured product thereof are shown in Table 2.

Curability:

The resin composition was applied on the primer-coated surface of a PET film A-4100 manufactured by Toyobo Co., Ltd., with a bar coater #3, and was irradiated with ultraviolet rays from a high-pressure mercury lamp of 120 w/cm at a lamp height of 10 cm and a conveyor speed of 50 m/min. Table 2 shows a number of irradiation operations at which the cured film surface became tack-free in a dry to the touch test.

A criterion for evaluation by the dry to the touch test is as follows:

Good: The cured film surface became tack-free after two or less runs of the irradiation.

Fair: The cured film surface became tack-free after not more than 5 and not less than 3 runs of the irradiation.

Poor: The cured film surface became tack-free after 6 or more runs of the irradiation.

Coatability:

The appearance of the cured film was visually evaluated.

Good: a flat surface having a good appearance.

Fair: the presence of a few stripes formed by the bar coater.

Poor: unusable because of remarkable unevenness of the surface.

Adhesive Properties:

A cellophane adhesive tape (mfd. by Nichiban Co., Ltd.) was stuck on the cured film obtained in the curability evaluation, and was quickly peeled off, after which the adhered state of the cured film was visually evaluated (a no-cut test). In this case, when the cured film would not be peeled off, notches were made crosswise on the cured film with a cutter knife and the adhered state of the cured film was visually evaluated in the same manner as above (a cross-cut test). A criterion for the evaluation was as follows:

Good: The film was peeled off in neither the no-cut test nor the cross-cut test.

Fair: The film was not peeled off in the no-cut test but was peeled off in the cross-cut test.

Poor: The film was peeled off in the no-cut test.

Odor:

The cured film obtained in the curability evaluation was allowed to stand at 20° C. and 50% RH for 24 hours, and then subjected to an organoleptic test for odor by maintaining the position of nose at a height of 2 cm above the cured film. The odor was evaluated according to the following criterion:

Good: substantially no odor.

Fair: a slight odor.

Poor: a strong odor.

Warpage of the PET Film:

The PET film after the coating and the curing obtained in the curability evaluation was allowed to stand at 20° C. and 50% RH for 24 hours, and then cut to a size of A4. Then, the sample piece thus obtained was allowed to stand on a plane with the cured film side upward, after which the degree of lifting from the plane was measured for the four corners of the sample piece and the average of the measured values was calculated. The warpage was evaluated according to the following criterion:

Good: The average degree of lifting was less than 3 mm.

Fair: The average degree of lifting was 3 mm to 5 mm.

Poor: The average degree of lifting was more than 5 mm.

EXAMPLES 2 TO 4 AND COMPARATIVE EXAMPLE 1

Crosslinked fine particles (P2 to P6) having the compositions shown in Table 1 were synthesized by the same process as in Example 1. The crosslinked fine particles of each kind were dispersed in the component (B) to blend them according to the recipe shown in Table 2 as in Example 1, whereby radiation curable resin compositions were obtained. These compositions were evaluated in the same manner as in Example 1.

The evaluation results are shown in Table 2.

EXAMPLE 5

Blending was conducted in the same manner as in Example 1 except for using benzoyl peroxide as a thermal polymerization initiator in place of the photopolymerization initiator among the components used in the Example 1. The resulting resin composition was applied on a glass substrate with a bar coater #3 and cured in an oven at 120° C. for 10 minutes, and the E-type viscosity and the polymerization shrinkage were determined in the same manner as in Example 1. E-type viscosity was 400 mPa·s and the polymerization shrinkage 9.1%. The cured film thus obtained showed the transparency and good appearance.

COMPARATIVE EXAMPLES 2 TO 7

The compositions shown in Table 2 were obtained by blending and subjected to evaluation of viscosity, polymerization shrinkage, curability, coating efficiency, adhesive properties and film warpage in the same manner as in the case of the radiation curable resin composition obtained in Example 1.

TABLE 1

|  |  | P1 | P2 | P3 | P4 | P5 |
|---|---|---|---|---|---|---|
| Compound (a$_1$) | MMA | 55 | 40 | 60 | 50 | 55 |
|  | nBMA | 30 | 30 |  |  | 30 |
|  | THFMA |  |  | 30 |  |  |
|  | ACMO |  |  |  | 30 |  |
|  | BD |  |  |  |  | 15 |
| Compound (a$_2$) | TMPTA |  | 30 |  |  |  |
|  | PETA | 15 |  | 10 | 20 |  |
| R1 (nm) |  | 180 | 150 | 130 | 90 | 150 |
| R2 (nm) |  | 230 | 160 | 170 | 110 | 280 |
| Percentage of cubical expansion (%) |  | 208 | 121 | 224 | 183 | 650 |
| Amount of double bonds (mmol/g) |  | 0.024 | 0.018 | 0.016 | 0.032 | 0.006 |
| Tg (° C.) |  | 130 | 150 | 125 | 160 | 95 |

The abbreviations in Table 1 are as follows: MMA: methyl methacrylate, nBMA: n-butyl methacrylate, THFMA: tetrahydrofurfuryl methacrylate, ACMO: acryloylmorpholine, BD: 1,3-butylene glycol dimethacrylate, TMPTA: trimethylolpropane triacrylate, PETA: a mixture consisting of 60% of pentaerythritol triacrylate and 40% of pentaerythritol tetraacrylate.

TABLE 2

|  |  | Example | | | | Comparative Example | | | | | | |
|---|---|---|---|---|---|---|---|---|---|---|---|---|
|  |  | 1 | 2 | 3 | 4 | 1 | 2 | 3 | 4 | 5 | 6 | 7 |
| Composition |  |  |  |  |  |  |  |  |  |  |  |  |
| Fine particles (A) | P1 | 30 |  |  |  |  |  |  |  |  |  |  |
|  | P2 |  | 20 |  |  |  |  |  |  |  |  |  |
|  | P3 |  |  | 15 |  |  |  |  |  |  |  |  |
|  | P4 |  |  |  | 35 |  |  |  |  |  |  |  |
|  | P5 |  |  |  |  | 20 |  |  |  |  |  |  |
|  | P6[*1)] |  |  |  |  |  | 20 | 20 |  |  |  |  |
|  | P7[*2)] |  |  |  |  |  |  |  | 20 | 20 |  |  |
|  | P8[*3)] |  |  |  |  |  |  |  |  |  | 20 |  |
| Compound | DPHA | 20 | 30 |  |  | 30 | 30 | 30 | 30 | 30 | 30 | 38 |
|  | PETA |  |  | 35 | 20 |  |  |  |  |  |  |  |

TABLE 2-continued

|  | Example | | | | Comparative Example | | | | | | |
|---|---|---|---|---|---|---|---|---|---|---|---|
|  | 1 | 2 | 3 | 4 | 1 | 2 | 3 | 4 | 5 | 6 | 7 |
| (B) TPGDA | 50 | 50 | 50 | 45 | 50 | 50 | 50 | 50 | 50 | 50 | 62 |
| Photo-polymerization initiator (C) HCPK | 5 | 5 | 5 | 5 | 5 | 5 | 9 | 5 | 9 | 5 | 5 |
| Evaluation results | | | | | | | | | | | |
| E-type viscosity (mPa · S) | 400 | 300 | 300 | 400 | —*4) | 15000 | 15000 | 15000 | 15000 | 300 | 50 |
| Polymerization shrinkage (%) | 9.1 | 10.4 | 11.1 | 8.5 | —*4) | 10.4 | 10.4 | 10.4 | 10.4 | 10.4 | 13.0 |
| Coating efficiency | Good | Good | Good | Good | —*4) | Poor | Poor | Fair | Fair | Good | Good |
| Curability | Good | Good | Good | Good | —*4) | Fair | Good | Fair | Good | Poor | Poor |
| Adhesive properties | Good | Good | Good | Good | —*4) | Good | Good | Good | Good | Poor | Poor |
| Odor | Good | Good | Good | Good | —*4) | Poor | Poor | Poor | Poor | Poor | Poor |
| Paper warpage | Good | Good | Good | Good | —*4) | Good | Good | Good | Good | Fair | Poor |

*1) P6: a linear polymer (weight average molecular weight 20,000) of MMA/nBMA=62 wt %/38 wt %.
*2) P7: a polystyrene (weight average molecular weight 20,000).
*3) P8: crosslinked poly(methyl methacrylate) particles MB20X-5 (average particle diameter 5 am) manufactured by Sekisui Plastics Co., Ltd.
*4) Evaluation was impossible because the compound (B) infiltrated into fine particles (P6) in the dispersing operation of the fine particles (P6) in the compound (B), so that the whole resin gelled.

The abbreviations in Table 2 are as follows:
DPHA: dipentaerythritol hexaacrylate,
PETA: a mixture consisting of 60% of pentaerythritol triacrylate and 40% of pentaerythritol tetraacrylate,
TPGDA: tripropylene glycol diacrylate,
HCPK: 1-hydroxycyclohexyl phenyl ketone.

Preparation of an Radiation Curable Resin Composition -2

EXAMPLE 6

Thirty parts by weight of the crosslinked fine particles (P1) obtained, 50 parts by weight of tripropylene glycol diacrylate, 20 parts by weight of urethane acrylate UK-6091 manufactured by Mitsubishi Rayon Co., Ltd. and 3 parts by weight of 1-hydroxycyclohexyl phenyl ketone as a photopolymerization initiator were mixed and then stirred for 5 minutes in a homodisper at a number of revolution of 4,000 rpm to obtain a milk-white radiation curable resin composition. The evaluation results of the wood coating performance for the resin composition are described below.

Evaluation of the Radiation Curable Resin Composition -2

Table 3 shows the E-type viscosity at 25° C. of the radiation curable resin composition obtained in Example 6.

The radiation curable composition obtained was applied on a plywood with a bar coater #60 and irradiated with ultraviolet rays from a high-pressure mercury lamp of 80 W/cm at a lamp height of 15 cm and a conveyor speed of 10 m/min until the cured film surface became tack-free in a dry to the touch test. The cured film thus obtained was subjected to various performance tests. The results obtained are shown in Table 3.

Performance Test Methods

Curability:
A number of ultraviolet irradiation operations required for the cured film surface to become tack-free was measured by touch with a finger, and the curability was evaluated according to the following criterion:
Good: two or less times.
Fair: not more than 5 and not less than 3 times.
Poor: six or more times.

Coating Efficiency:
The appearance of the cured film was visually evaluated.
Good: a flat surface having a good appearance.
Fair: the presence of a few stripes formed by the bar coater.
Poor: unusable because of remarkable unevenness of the surface.

Polymerization Shrinkage:
The polymerization shrinkage was determined from the specific gravities of the liquid composition and the cured film, and was evaluated according to the following criterion:
Good: less than 8%.
Fair: not more than 10% and not less than 8%.
Poor: more than 10%.

Crack Resistance:
A cycle test consisting of standing at 80° C. for 2 hours and standing at -20° C. for 2 hours per cycle was repeated, and the crack resistance was evaluated in terms of a number of cycles that cause a crack in the coating film.
Good: 50 or more cycles.
Fair: 10 to 49 cycles.
Poor: less than 10 cycles.

EXAMPLES 7 TO 9 AND COMPARATIVE EXAMPLE 8

Crosslinked fine particles (P2 to P5) having the compositions shown in Table 1 were synthesized by the same process as in Example 1. The crosslinked fine particles of each kind were dispersed in the component (B) to blend them according to the recipe shown in Table 3, as in Example 1, whereby radiation curable compositions were obtained. Cured films of these compositions were evaluated in the same manner as in Example 1.

The evaluation results are shown in Table 3.

COMPARATIVE EXAMPLES 9 TO 12

The compositions shown in Table 3 were obtained by blending and subjected to evaluation of viscosity, curability, coating efficiency, polymerization shrinkage and crack resistance in the same manner as the evaluation of the radiation curable resin composition obtained in Example 1.

The evaluation results are shown in Table 3.

Using the radiation curable composition obtained, printing was conducted on coated paper "NK Kata-Art" (mfd. by Nippon Kakoh Seishi Co., Ltd.) with a screen printer so that the thickness of the composition would be 15 $\mu$m. Then, the printed-paper placed on a conveyor was passed under a metal halide lamp having an intensity of 120 W/cm, at a lamp height of 10 cm. In dry to the touch evaluation, a maximum line speed at which the cured film surface became tack-free was evaluated according to the following criterion.
Curability:

TABLE 3

|  |  | Example |  |  |  | Comparative Example |  |  |  |  |
|---|---|---|---|---|---|---|---|---|---|---|
|  |  | 6 | 7 | 8 | 9 | 8 | 9 | 10 | 11 | 12 |
| Composition |  |  |  |  |  |  |  |  |  |  |
| Fine | P1 | 30 |  |  |  |  |  |  |  |  |
| particles | P2 |  | 40 |  |  |  |  |  |  |  |
| (A) | P3 |  |  | 20 |  |  |  |  |  |  |
|  | P4 |  |  |  | 10 |  |  |  |  |  |
|  | P5 |  |  |  |  | 30 |  |  |  |  |
|  | P6 |  |  |  |  |  | 30 |  |  |  |
|  | P8 |  |  |  |  |  |  | 30 |  |  |
| Com- | UK-6091 | 20 | 17 | 23 | 26 | 20 | 20 | 20 | 29 |  |
| pound | UK-1102 |  |  |  |  |  |  |  |  | 50 |
| (B) | TPGDA | 50 | 43 | 57 | 64 | 50 | 50 | 50 | 71 | 50 |
| Photo-polymerization initiator HCPK |  | 3 | 3 | 3 | 3 | 3 | 3 | 3 | 3 | 3 |
| Evaluation results |  |  |  |  |  |  |  |  |  |  |
| E-type viscosity (mPa · S) |  | 500 | 600 | 400 | 300 | —*5) | 20000 | 500 | 300 | 400 |
| Curability |  | Good | Good | Good | Good | —*5) | Fair | Poor | Fair | Poor |
| Coating efficiency |  | Good | Good | Good | Good | —*5) | Poor | Fair | Good | Good |
| Polymerization shrinkage |  | Good | Good | Good | Good | —*5) | Good | Good | Fair | Fair |
| Crack resistance |  | Good | Good | Good | Good | —*5) | Good | Fair | Poor | Poor |

*5): Evaluation was impossible because the compound (B) infiltrated into fine particles (P5) in the dispersing operation of the fine particles (P5) in the compound (B), so that the whole resin was gelatinized.

The abbreviations in Table 3 are as follows:
UK-6091: urethane acrylate manufactured by Mitsubishi Rayon Co., Ltd.,
UK-1102: an unsaturated polyester manufactured by Mitsubishi Rayon Co., Ltd.,
TPGDA: tripropylene glycol diacrylate,
HCPK: 1-hydroxycyclohexyl phenyl ketone.

Preparation of a Radiation Curable Composition—3

EXAMPLE 10

Thirty parts by weight of the crosslinked fine particles (P1) obtained, 50 parts by weight of ditrimethylolpropane tetraacrylate, 20 parts by weight of neopentyl glycol hydroxypivalate diacrylate, 20 parts by weight of Rionol Red F2B (mfd. by TOYO INK MFG. CO., LTD) as a pigment and 3 parts by weight of Irgacure 907 (mfd. by Ciba Speciality Chemicals Ltd.) as a photopolymerization initiator were mixed and then subjected to dispersion with a triple roll mill to obtain a radiation curable composition. The results of evaluation of this composition as printing ink are described below.

Evaluation of the Radiation Curable Composition—3

Table 4 shows the result of measuring the E-type viscosity at 25° C. of the radiation curable composition obtained in Example 10.

Table 4 shows a maximum line speed at which the radiation curable composition became tack-free owing to the irradiation of one passing when the line speed was increased by increments of 10 m/min.

When a composition was curable at a line speed of 50 m/min or more, the composition was rated eligible. The cured film thus obtained was subjected to performance tests with regard to adhesive properties and appearance of print. The results obtained are shown in Table 4.
Adhesive Properties:

A cellophane adhesive tape (mfd. by Nichiban Co., Ltd.) was stuck on the printing and coating film which had been cured, after which the tape was quickly peeled off, and the adhered state of the cured film was visually evaluated (a no-cut test). In this case, when the coating film was not peeled off, notches were made crosswise on the cured film with a cutter knife and the adhered state of the cured film was visually evaluated in the same manner as above (a cross-cut test). The evaluation was carried out according to the following criterion and the result obtained is shown in Table 4:

Good: The film was peeled off in neither the no-cut test nor the cross-cut test.
Fair: The film was not peeled off in the no-cut test but was peeled off in the cross-cut test.
Poor: The film was peeled off in the no-cut test.

Appearance of Print:
The appearance of the printing was visually evaluated according to the following criterion. The result obtained is shown in Table 2.

Excellent: The appearance of print was so good that it was smooth and had a high gloss.

Good: The appearance of print was smooth but the print surface was matte.

Fair: Curing in depth was not sufficient, resulting in formation of a few wrinkles on the print surface.

Poor: Pring was not cured in depth, resulting in formation of a large number of wrinkles on the print surface.

Warpage of the Printed Paper:

The printed paper after the curing was allowed to stand at 20° C. and 50% RH for 24 hours, and then cut to a size of A4. Then, the sample piece thus obtained was allowed to stand on a plane with the cured film side upward, after which the degree of lifting from the plane was measured for the four corners of the sample piece and the average of the measured values was calculated. The warpage was evaluated according to the following criterion:

Good: The average degree of lifting was less than 3 mm.

Fair: The average degree of lifting was 3 mm to 5 mm.

Poor: The average degree of lifting was more than 5 mm.

EXAMPLES 11 TO 13 AND COMPARATIVE EXAMPLES 13

Crosslinked fine particles (P2 to P5) having the compositions shown in Table 1 were synthesized by the same process as in Example 1. The crosslinked fine particles of each kind were dispersed in the component (B) to blend them according to the recipe shown in Table 4, as in Example 1, whereby radiation curable compositions were obtained. These compositions were evaluated in the same manner as in Example 1.

The evaluation results are shown in Table 4.

COMPARATIVE EXAMPLES 14 TO 18

The compositions shown in Table 4 were obtained by blending and subjected to evaluation of curability, adhesive properties, appearance of coating, and paper warpage in the same manner as the evaluation of the radiation curable resin composition obtained in Example 1.

The evaluation results are shown in Table 4.

TABLE 4

| | Example | | | | Comparative Example | | | | | |
|---|---|---|---|---|---|---|---|---|---|---|
| | 10 | 11 | 12 | 13 | 13 | 14 | 15 | 16 | 17 | 18 |
| Fine particles (A) | | | | | | | | | | |
| P1 | 30 | | | | | | | | | |
| P2 | | 40 | | | | | | | | |
| P3 | | | 20 | | | | | | | |
| P4 | | | | 10 | | | | | | |
| P5 | | | | | 30 | | | | | |
| P9*6) | | | | | | 30 | 30 | | | |
| P8 | | | | | | | | 30 | | |
| Compound (B) | | | | | | | | | | |
| DTMPTA | 50 | 43 | 57 | 64 | 50 | 50 | 50 | 50 | 71 | 71 |
| HPNDA | 20 | 17 | 23 | 26 | 20 | 20 | 20 | 20 | 29 | 29 |
| Photo-polymerization initiator | 3 | 3 | 3 | 3 | 3 | 3 | 8 | 3 | 3 | 8 |
| Pigment | 20 | 20 | 20 | 20 | 20 | 20 | 20 | 20 | 20 | 20 |
| E-type viscosity (mPa · s) | 3000 | 3500 | 2000 | 1000 | *7) | 6000 | 6000 | 3000 | 800 | 800 |
| Line speed (m/min) | 60 | 60 | 50 | 50 | *7) | 30 | 50 | 30 | 30 | 50 |
| Adhesive properties | Good | Good | Good | Good | *7) | Good | Fair | Poor | Poor | Poor |
| Appearance of print | Excellent | Excellent | Excellent | Excellent | *7) | Excellent | Fair | Good | Excellent | Poor |
| Paper warpage | Good | Good | Good | Good | *7) | Good | Fair | Fair | Poor | Poor |

*6) P9: DAP-K (a diallyl phthalate prepolymer) manufactured by Daisoh Co., Ltd.

*7) Further evaluation was impossible because the compound (B) infiltrated into fine particles (P5) in the dispersing operation of the fine particles (P5) in the compound (B), so that the whole resin was gelatinized.

What is claimed is:

1. A curable resin composition substantially free of water and solvents, comprising crosslinked fine particles (A) having a Tg of 100° C. or higher and an amount of remaining double bonds of 0.01 mmol/g or more which are obtainable by polymerizing a compound (a1) having one or two radical-polymerizable ethylenic unsaturated groups in the molecule and a compound (a2) having three or more (meth)acryloyl groups in the molecule, and a compound (B) having at least one (meth)acryloyl group in the molecule, wherein compound (B) is selected from the group consisting of (meth)acrylic acid ester, polyester poly(meth)acrylate, epoxy poly(meth)acrylate, urethane poly(meth)acrylate, and combinations thereof.

2. A curable resin composition according to claim 1, which has a viscosity at 25° C. of 10 Pa·s or less.

3. A curable resin composition according to claim 1, which contains a radical polymerization initiator (C).

4. A curable resin composition according to claim 3, wherein as the radical polymerization initiator (C), there is used a photopolymerization initiator ($c_1$) capable of generating a radical on irradiation with active energy rays, and/or a thermal polymerization initiator ($c_2$) having a 10-hours half-life temperature of 100° or lower.

5. A curable resin composition according to claim 1, wherein the crosslinked fine particles (A) are those having an average primary-particle diameter in a range of 10 to 1,000 nm.

6. A curable resin composition according to claim 1, wherein the crosslinked fine particles (A) are those having a percentage of cubical expansion in methyl ethyl ketone at 25° C. of 300% or less as calculated by the following equation:

$$V = (R_2)^3/(R_1)^3 \times 100$$

wherein V is percentage of cubical expansion (%), $R_1$ is the primary-particle diameter of the crosslinked fine particles (A) measured in water at 25° C. by a dynamic light scattering method, and $R_2$ is the primary-particle diameter of the crosslinked fine particles (A) measured in methyl ethyl ketone at 25° C. by the dynamic light scattering method.

7. A curable resin composition according to claim 1, wherein the crosslinked fine particles (A) are those in which the proportions of the component ($a_1$) and the component ($a_2$) are as follows: in the total proportion (100 wt %) of the component ($a_1$) and the component ($a_2$), the proportion of the component ($a_1$) ranges from 55 to 95 wt %, and the proportion of the component ($a_2$) ranges from 5 to 45 wt %.

8. A curable resin composition according to claim 1, wherein the proportions of the crosslinked fine particles (A) and the compound (B) are as follows: in the total proportion (100 wt %) of the component (A) and the component (B), the proportion of the component (A) ranges from 5 to 50 wt %, and the proportion of the component (B) ranges from 50 to 95 wt %.

9. A film coating, comprising the curable resin composition according to claim 1 in contact with a surface.

10. A coating composition, comprising the curable resin composition according to claim 1.

11. A printing ink, comprising the curable resin composition according to claim 1.

12. The curable resin composition according to claim 1, wherein compound (B) is a (meth)acrylic acid ester.

13. The curable resin composition according to claim 1, wherein compound (B) is a polyester poly(meth)acrylate.

14. The curable resin composition according to claim 1, wherein compound (B) is an epoxy poly(meth)acrylate.

15. The curable resin composition according to claim 1, wherein compound (B) is a urethane poly(meth)acrylate.

16. The curable resin composition according to claim 1, wherein compound (B) is a combination of two or more of said (meth)acrylic acid ester, polyester poly(meth)acrylate, epoxy poly(meth)acrylate, and urethane poly(meth)acrylate.

* * * * *